(12) United States Patent
Akhter et al.

(10) Patent No.: US 9,881,524 B2
(45) Date of Patent: Jan. 30, 2018

(54) TAMPER EVIDENT LABELS

(71) Applicant: Avery Dennison Corporation, Glendale, CA (US)

(72) Inventors: Sohail Akhter, Maharashtra (IN); Anil Kumar Dubey, Maharashtra (IN); Amit Sharma, Haryana (IN)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/638,684

(22) Filed: Mar. 4, 2015

(65) Prior Publication Data
US 2015/0255009 A1 Sep. 10, 2015

Related U.S. Application Data

(60) Provisional application No. 61/947,611, filed on Mar. 4, 2014.

(51) Int. Cl.
*G09F 3/00* (2006.01)
*G09F 3/10* (2006.01)
(Continued)

(52) U.S. Cl.
CPC ......... *G09F 3/0292* (2013.01); *B65D 25/205* (2013.01); *C09J 7/0296* (2013.01); *G09F 3/02* (2013.01); *G09F 3/10* (2013.01); *C09J 2203/338* (2013.01); *G09F 2003/0208* (2013.01); *G09F 2003/0241* (2013.01); *G09F 2003/0257* (2013.01); *G09F 2003/0272* (2013.01); *Y10T 428/263* (2015.01); *Y10T 428/265* (2015.01); *Y10T 428/266* (2015.01);
(Continued)

(58) Field of Classification Search
CPC . G09F 3/0292; G09F 3/02; G09F 3/10; G09F 2003/0208; G09F 2003/0241; G09F 2003/0272; G09F 2003/0257; B65D 25/205; C08J 5/12; Y10S 428/915; Y10S 428/916; Y10T 428/2848; Y10T 428/263; Y10T 428/265; Y10T 428/266; Y10T 428/2839; Y10T 428/14
See application file for complete search history.

(56) References Cited

U.S. PATENT DOCUMENTS 4,841,652 A * 6/1989 Sakashita .................. G09F 3/02
283/81
5,049,538 A * 9/1991 Mochizuki ......... B41M 5/38228
428/212
(Continued)

FOREIGN PATENT DOCUMENTS

WO 99/55791 11/1999

OTHER PUBLICATIONS

International Search Report and Written Opinion dated May 15, 2015 issued in corresponding International Application No. PCT/US2015/018759 filed Mar. 4, 2015.
(Continued)

*Primary Examiner* — Patricia L. Nordmeyer
(74) *Attorney, Agent, or Firm* — Avery Dennison Corporation

(57) ABSTRACT

The present invention includes laminates and a tamper indication system. In some embodiments, the laminate and the tamper indication system may change color to indicate exposure of the laminate to an acrylic-based adhesive.

30 Claims, 4 Drawing Sheets

(51) Int. Cl.
  *B65D 25/20* (2006.01)
  *G09F 3/02* (2006.01)
  *C09J 7/02* (2006.01)
(52) U.S. Cl.
  CPC .... *Y10T 428/2839* (2015.01); *Y10T 428/2848* (2015.01)

(56) References Cited

U.S. PATENT DOCUMENTS

| | | | | |
|---|---|---|---|---|
| 5,318,817 | A * | 6/1994 | Ohno | B41M 5/41 40/6 |
| 5,699,326 | A * | 12/1997 | Haas | G04F 1/00 116/200 |
| 5,719,828 | A * | 2/1998 | Haas | G04F 1/00 116/200 |
| 5,785,354 | A * | 7/1998 | Haas | G04F 1/00 283/114 |
| 5,862,101 | A * | 1/1999 | Haas | G04F 1/00 116/200 |
| 5,957,458 | A | 9/1999 | Haas et al. | |
| 6,162,517 | A * | 12/2000 | Oshima | B41M 5/38214 428/137 |
| 7,294,379 | B2 * | 11/2007 | Ko | G01K 3/04 368/327 |
| 2011/0111188 | A1 | 5/2011 | Xu et al. | |

OTHER PUBLICATIONS

International Preliminary Report on Patentability dated Sep. 6, 2016 issued in corresponding International Application No. PCT/US2015/018759 filed Mar. 4, 2015.

* cited by examiner

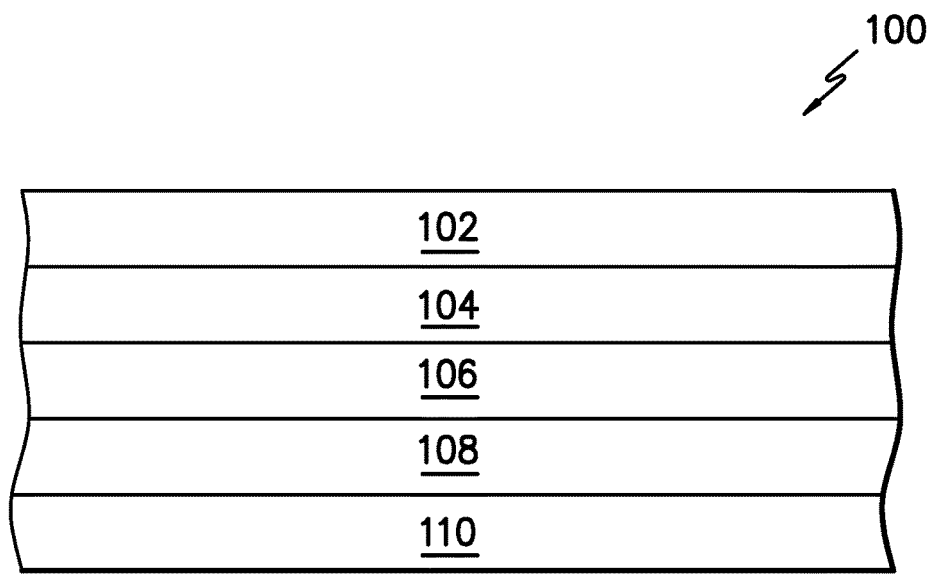
FIG. -1-
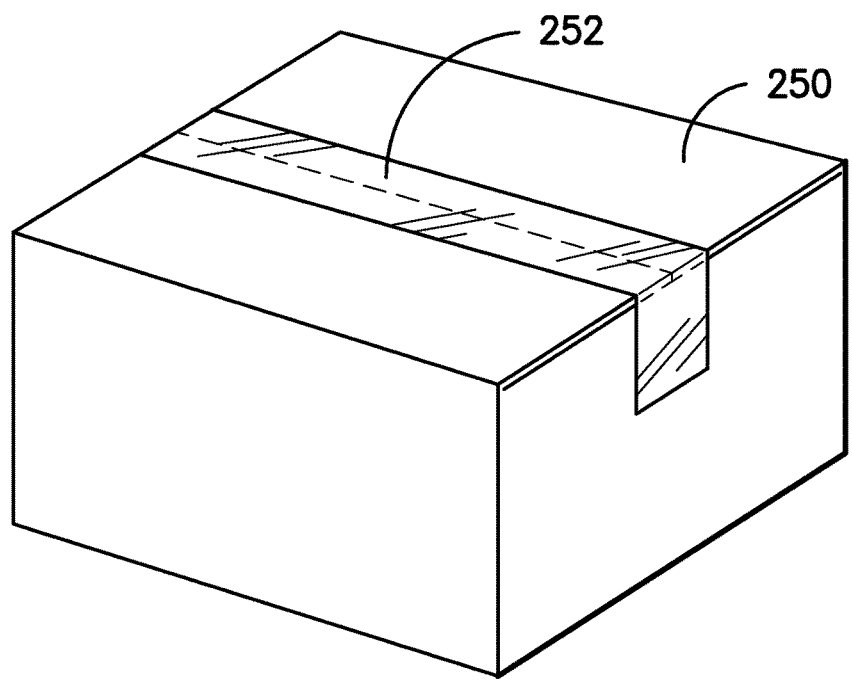
FIG. -2A-

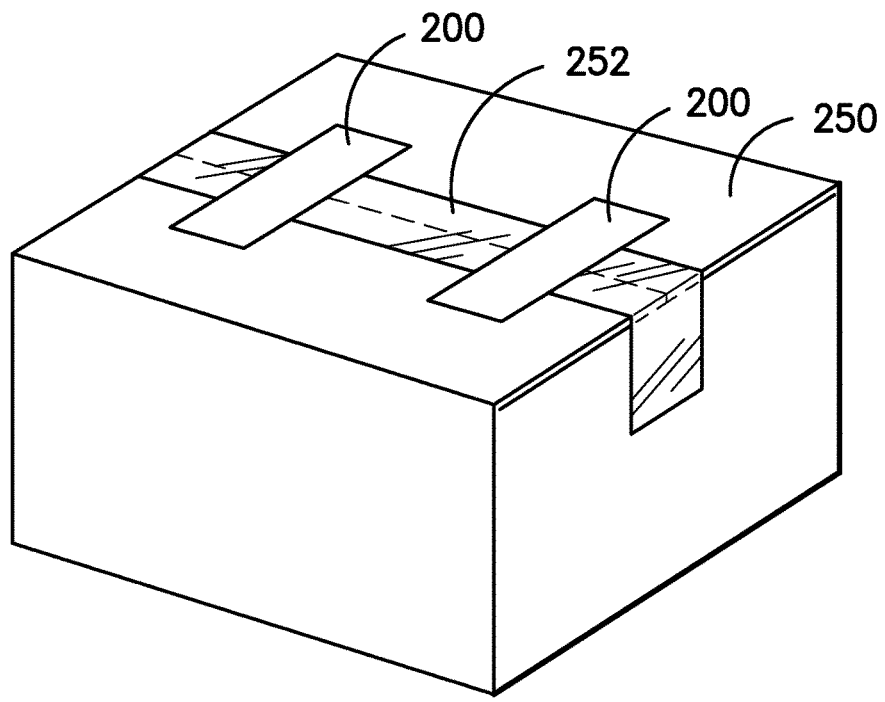
FIG. -2B-
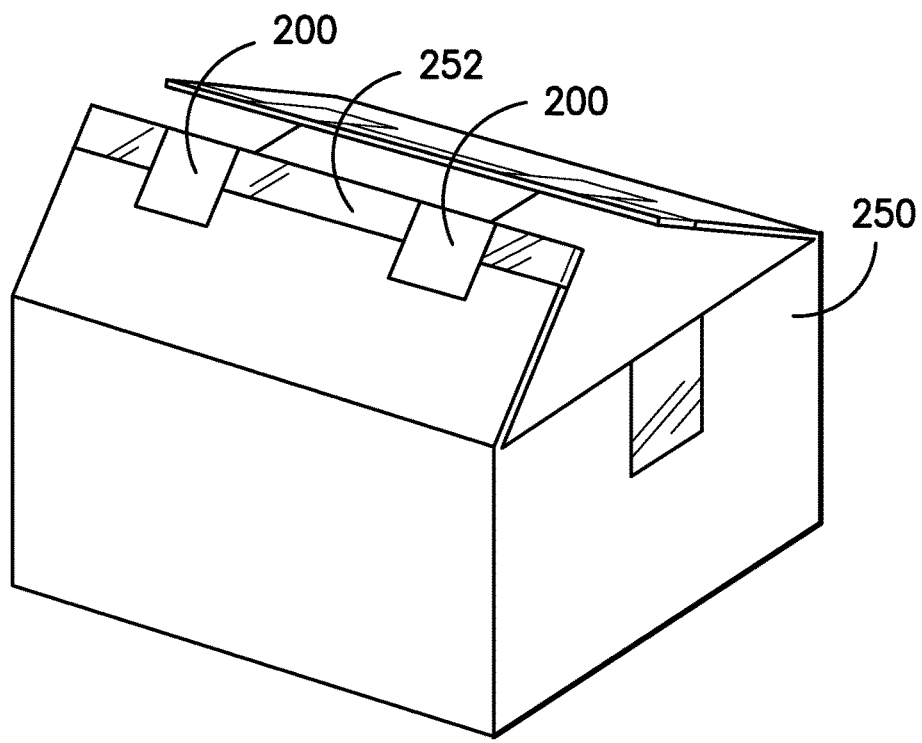
FIG. -2C-

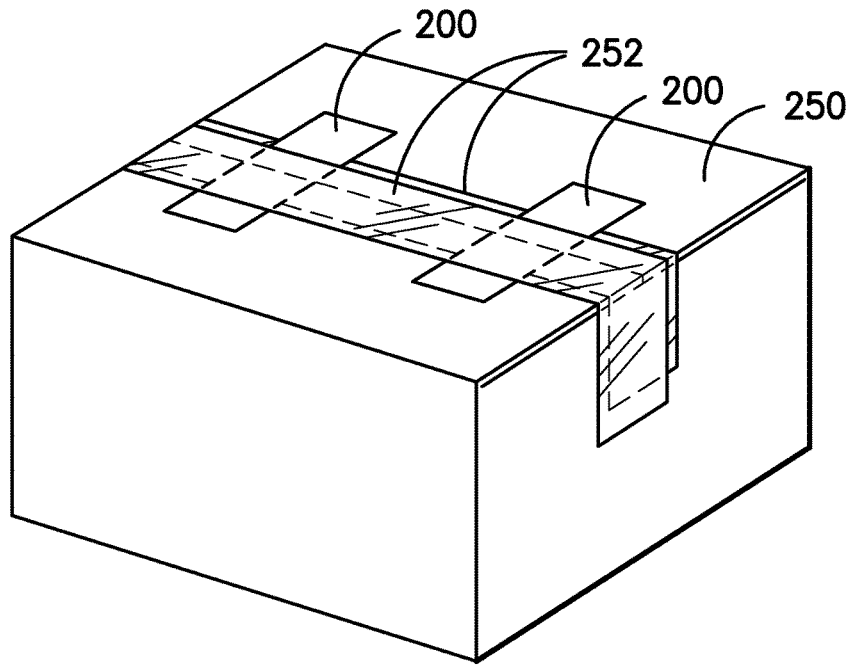
FIG. -2D-
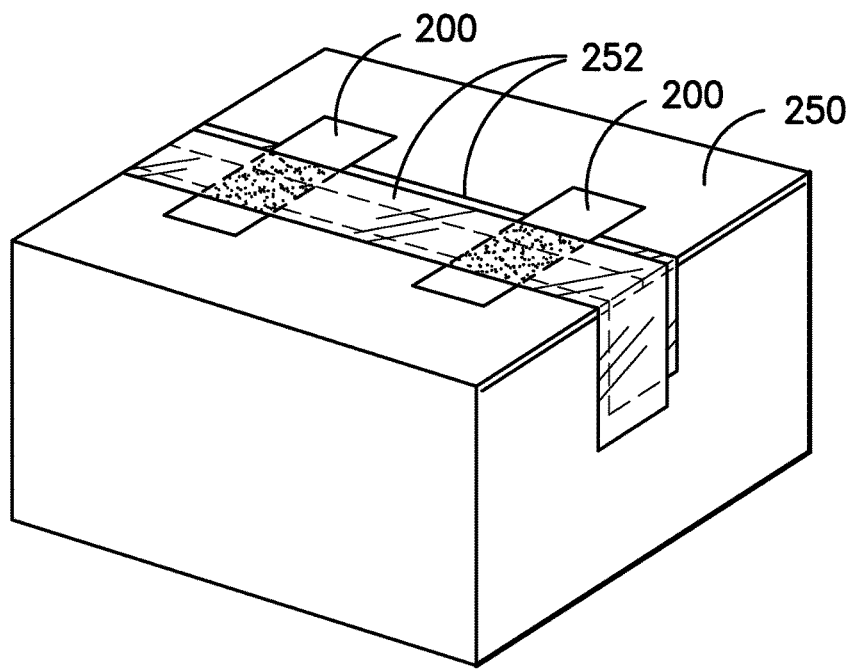
FIG. -2E-

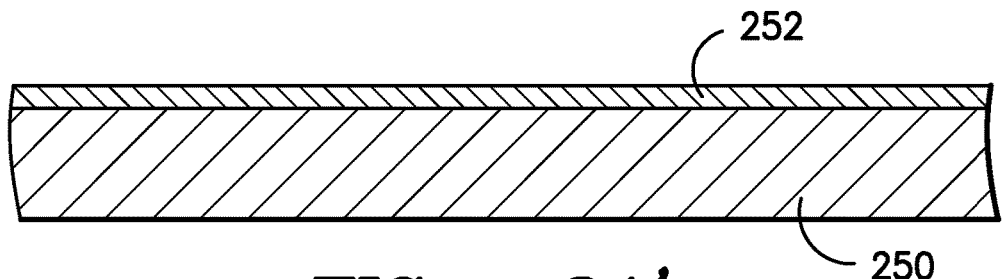
FIG. -2A'-
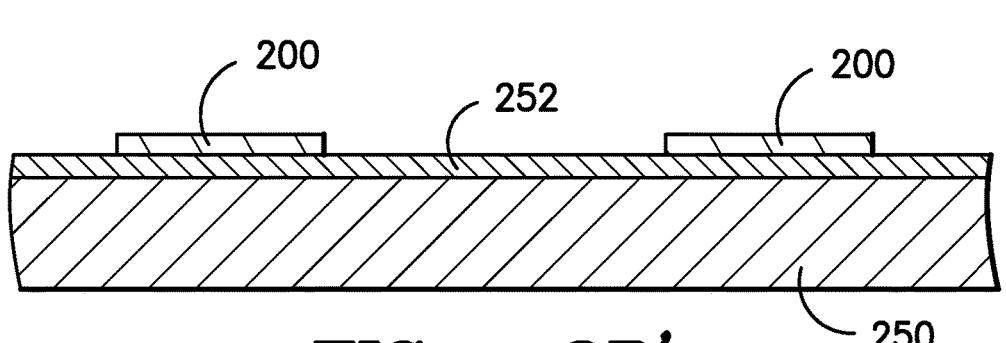
FIG. -2B'-
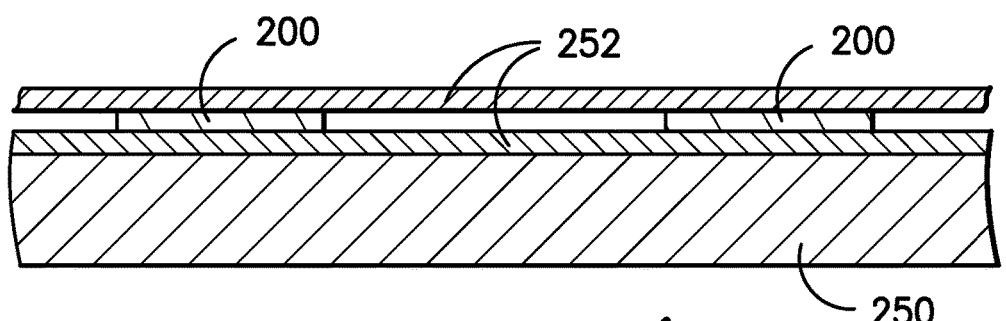
FIG. -2D'-
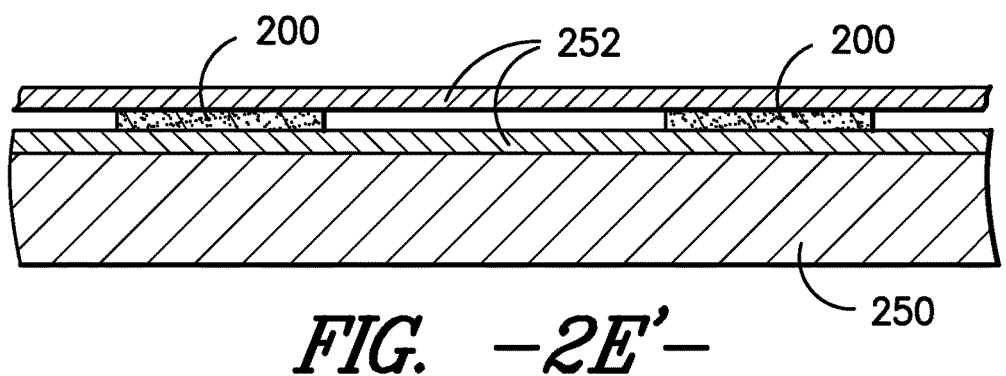
FIG. -2E'-

TAMPER EVIDENT LABELS

CROSS-REFERENCE TO RELATED APPLICATION

The present application claims the benefit of U.S. Provisional Application No. 61/947,611 filed Mar. 4, 2014, which is incorporated herein by reference in its entirety.

BACKGROUND OF THE INVENTION

For some sealed packages and containers, it is useful to determine if the package or container has been opened. Laminates, such as labels based on films and paper, may be used to indicate tampering with a package or container.

SUMMARY OF THE INVENTION

In one embodiment, the invention includes a laminate. The laminate includes a dye layer having an activatable coating, and the activatable coating includes a sublimation-type dispersed dye and a binder. The laminate also includes a face layer, and an adhesive, wherein the face layer is disposed between the dye layer and the adhesive.

In another embodiment, the invention includes a tamper indication system, wherein a laminate of the present invention is applied to a package.

The following description illustrates one or more embodiments of the invention and serves to explain the principles and exemplary embodiment of the invention.

BRIEF DESCRIPTION OF THE DRAWINGS

FIG. 1 depicts an embodiment of a laminate of the present invention.

FIG. 2A depicts a sealed package, and FIG. 2A' shows a side view of the top of the package of FIG. 2A.

FIG. 2B depicts the sealed package of FIG. 2A having an embodiment of a laminate of the present invention adhered thereto, and FIG. 2B' shows a side view of the top of the package of FIG. 2B.

FIG. 2C depicts the package of FIG. 2B unsealed.

FIG. 2D depicts the package of FIG. 2C resealed, and FIG. 2D' shows a side view of the top of the package of FIG. 2D.

FIG. 2E depicts an exemplary color change of an embodiment of the present invention for the resealed package of FIG. 2E, and FIG. 2E' shows a side view of the top of the package of FIG. 2E.

DETAILED DESCRIPTION OF EXEMPLARY EMBODIMENTS

Reference will now be made in detail to exemplary embodiments of the present invention, one or more examples of which are illustrated in the accompanying drawings. Each example is provided by way of explanation of the invention and not by limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. In addition, the use of reference characters with the same two ending digits as other reference characters to indicate structure in the present specification and drawings, without a specific discussion of such structure, is intended to represent the same or analogous structure in different embodiments. Unless otherwise indicated herein, all percentages used for a component refer to the percentage by weight.

In some embodiments, the present invention includes a tamper-evident laminate. By way of example with respect to an illustrative embodiment, FIG. 1 shows a laminate 100 having dye layer 102, face layer 104, and adhesive 106 adjoined with liner 110 having release coating 108 displaced upon the face of liner 110 that is adjacent to adhesive 106. In some embodiments, laminates of the present invention may have additional layers and/or fewer layers. For example, in some embodiments one or more skin layers disposed between a dye layer and a face layer.

Laminates of the present invention may be of any suitable overall thickness and each layer may have any suitable thickness. By way of example, in some embodiments a laminate may include a dye layer having a thickness of about 0.2 microns to about 20 microns, a face layer having a thickness of about 20 microns to about 150 microns, an adhesive layer having a thickness of about 5 microns to about 40 microns, and, a release liner having a thickness of about 12 microns to about 100 microns, wherein each of the foregoing ranges specifically includes each intermittent value therein.

In some embodiments, the dye layer may include an activatable coating, which may change colors when exposed to an adhesive. By way of example, such activatable coatings may include a sublimation-type dispersed dye and a binder. The activatable coating may be coated onto the face layer, wherein the activatable coating forms the dye layer.

As used herein, a sublimation-type dispersed dye includes a water insoluble dye. In some embodiments, the sublimation-type dispersed dye may be soluble in and compatible with acrylic polymers and binders. One dye that is suitable in some embodiments, for example, is Macrolex Red H, which is available from Lanxess Deutschland GmbH.

Any suitable binder may be used in the dye layer. Suitable binders in the dye layer may include polyurethane-based binders and polyethylenimine-based binders. In some embodiments, the binder should be selected so that it does not dissolve the dye. In addition, in some embodiments, such binders may optionally include one or more dispersing agents, cross linkers, catalyst, and/or photo initiators. By way of example, one binder that may be used in some embodiments of the invention is Mica A131X, available from Mica Corporation, which is a polyethylenimine binder.

Activatable coatings, such as sublimation-type dispersed dyes, may vary in the time that a color change occurs after exposure to an adhesive, and a suitable activatable coating with such indication time period may be selected as desired for a particular embodiment. In some embodiments, the activatable coating, such as a sublimation-type dispersed dye, may change color after about five minutes or more following exposure to an adhesive.

For a sublimation-type dispersed dye and binder used as an activatable coating within the context of the present invention, any suitable formulation may be used. In some embodiments, by way of example, the dye amount may be from about 1% to about 50 of the binder amount by dry weight, including each intermittent value therein. In some embodiments, the amount of dye may be about 5% to about 25% of the binder amount by dry weight.

As applied as a dye layer, an activatable coating may be applied at a coat weight of about 0.2 gram per square meter to about 10 grams per square meter, including each intermittent value therein. By way of further example, the activatable coating may be applied at a coat weight of about 1 gram per square meter to about 5 grams per square meter.

Face layers of the present invention may include any suitable components. For example, in some embodiments, face layers of the present invention may include any filmic- or paper-based materials. For example, such materials may include, without limitation, polyolefins, such as biaxially-oriented polypropylene or polyethylene, polyethylene terephthalate, polyamides, polystyrene, ethylene vinyl alcohol, and combinations thereof. In addition, any suitable paper materials may also be used, alone or in combination with other materials, in some embodiments.

Films of the present invention may also include an adhesive, which may form the adhesive layer. For instance, as shown in the exemplary embodiment in FIG. 1, a face layer of the present invention may have an adhesive disposed on a bottom surface of the face layer, wherein the coated adhesive constitutes the adhesive layer.

Any suitable adhesives may be used for a particular embodiment within the scope of the invention. For example, in some embodiments, pressure sensitive adhesives may be utilized, which are known in the art. Such pressure sensitive adhesives may have a low glass transition temperature (Tg) and may be applied to a given surface at room temperature with the application of a small amount of pressure. Pressure sensitive adhesives may be tacky at room temperature and adhere to a wide variety of high and low energy surfaces. By way of further example, suitable pressure sensitive adhesives may include any solvent-based or emulsion-based pressure sensitive adhesive, such as acrylic or rubber based pressure sensitive adhesives. In some embodiments the pressure sensitive adhesive may be a water-based adhesive. By way of further example, in some embodiments, adhesives used in accordance with the present invention may include, without limitation, solutions, hot melts, and ultraviolet hot melts. One of ordinary skill in the art will appreciate that, in some embodiments, adhesives of the present invention may be cross-linkable, such as by using, by way of example, metal complexes, aziridines, isocyanites, ultraviolet curing, or electron beam curing. In some embodiments, adhesives of the present invention may also include color dyes, fillers, and/or stabilizers, all of which are known in the art.

Embodiments of the present invention may also include a release coating, such as in the embodiment illustrated in FIG. 1. Such release coatings may control the adhesion between two surfaces. For example, with reference to the embodiment of FIG. 1, the liner 110 may be separated from the adhesive prior to the application of the film to a substrate. In some embodiments, a release coating may be disposed between the liner and the adhesive, such as disposed upon the liner. Such release coatings may aid in the removal of the release liner from the adhesive.

Any suitable release coatings may be used for embodiments of the present invention. For example, release coatings may include silicone polymers and copolymers, which may also be referenced as polyorganosiloxanes. Such release coatings may be cured to a liner, such as using radiation or thermal curing as is known in the art. Such silicone-coated liners may have a release force that is low enough to enable the release backing sheet to be readily removed from a pressure sensitive adhesive but not so low that the liner will become separated from the pressure sensitive adhesive prior to when desired by forces normally encountered in handling and processing, such as printing, die cutting and matrix stripping. As used herein, "release force" means the amount of force required to peel or separate the release-coated substrate from the adhesive.

Embodiments of films of the present invention may also include a release liner as illustrated in FIG. 1. The pressure sensitive adhesive may adhere to the release liner, such as the release coated surface of the release liner. The adhesion may be sufficient to enable the product to be handled prior to application of the label to a substrate. Exemplary release liners include, without limitation, paper release liners wherein one side of the paper (the release side) is coated with a silicone polymer or copolymer.

The following example laminate was prepared and is illustrative of one embodiment of the present invention:

EXAMPLE

| Layer | Description |
| --- | --- |
| Coating layer | Macrolex Red H Dye (at 15% of dry weight of binder) and Mica A131X Binder; coated at 5 grams per square meter; 5 micron thickness |
| Face layer | 70 Gsm uncoated, white, smooth surface paper having a weight of 70 grams per square meter; 60 micron thickness |
| Adhesive layer | Hot Melt Adhesive 52060 available from Avery Dennison Corp. |
| Release coating | Heat curable solvent-less silicon-based release coating; 1 micron thickness |
| Liner layer | Glassine paper-based liner having weight of 62 grams per square meter; 53 micron thickness |

The example laminate was manufactured in the following manner. The face layer was coated with the dye and binder solution using a mayer bar. After coating, the face layer was laminated with the release-coated liner paper using the hot melt adhesive. The laminate was then cut to a size of 50 mm by 30 mm. The laminate was exposed to a clear acrylic tape adhesive, and the color indication was monitored visually. The progression of the color change was gradual. In particular, the color change became visible after about five minutes and was clearly identifiable after about fifteen minutes. After thirty minutes, there was a significant color change had occurred.

In use, films of the present invention may be applied to a substrate, such as a package or to tape sealing a package. By way of example and with reference to FIG. 1, dye layer 102, face layer 104, and adhesive 106 may be separated from the release coating 108 and liner 110 by pulling the liner away from adhesive 106. The then-exposed adhesive 106 may be contacted with and pressed onto the substrate to which it is desired to be adhered, such that the applied portion of film 100 to the substrate includes dye layer 102, face layer 104, and adhesive 106.

In some embodiments, laminates of the present invention may be placed over the seal of a package as an indicator of tampering with the package seal. In some embodiments, the laminate may be used itself to seal a package or seam. For example, packages, such as shipping boxes, may be sealed using an acrylic-based tape, such as a biaxially-oriented polypropylene tape. If the tape is cut or slit, the package contents may be accessed and then the package could be resealed with additional tape, possibly without any indication that the package had been accessed. In some embodiments of the present invention, films of the present invention may be adhered to tape sealing a package and, in the event that additional tape is subsequently added above the inventive film (which could be indicative of tampering with the package), then the inventive film will develop a color. The color may indicate that additional tape was added, which may be used to signal potential tampering with the package.

Such embodiments are further illustrated with reference to FIGS. 2A-E and FIGS. 2A', 2B', 2D', and 2E'. As shown in FIG. 2A, package 250 is sealed with clear tape 252. As shown in FIG. 2B, film 200 is applied on the non-adhesive side of tape 252. Prior to application, any liner (if any) may be separated from film 200. Although film 200 is shown as applied in discrete strips in FIG. 2B, any application of such films are within the scope of the present invention. By way of example, in some embodiments, laminates of the present invention may applied across all or a part of sealing tape. In some embodiments, films of the present invention may be applied in discrete or random intervals over a sealing tape and, in other embodiments, a patterned application of films over sealing tape may be utilized. In still other embodiments, films of the present invention may be applied on other areas sealed using sealing tape, such as the bottom, sides, or edges of a package. As shown in FIG. 2C, package 250 has been opened by cutting tape 252. As shown in FIG. 2D, package 250 has been resealed using additional tape 252, which is placed on top of film 200. Specifically, the adhesive of tape 252 is at least partially in contact with dye layer 202 of film 200. As shown in FIG. 2E, the contact between tape 252 and film 200 has resulted in film 200 changing color, which indicates that additional tape has been applied and indicates potential tampering with package 250.

As explained above, a color change may occur in a laminate of the present invention after the laminate is contacted with an acrylic-based adhesive, such as present on clear packaging tape. In some embodiments, the color change may result from the dye in the dye layer bleeding into the acrylic adhesive, wherein such bleeding may occur gradually in some embodiments. Upon bleeding into the acrylic adhesive, the dye may interact with the acrylic compounds and a different color of the dye may result from the spreading of the dye within the binder matrix. As used herein, a change of color or different color includes different shades and tones of the same color.

Laminates of the present invention may be used in any suitable application. By way of example, such uses may include upon shipping and cargo packages, crates, containers, boxes, jars, and any other substrates that may be sealed with a sealing tape and for which potential tampering indications may be desired.

In addition, laminates of the present invention may be provided in any suitable medium. For example, in some embodiments, laminates of the present invention may be provided as tapes. Such tapes may be optionally perforated into segments. In other embodiments, for example, laminates of the present invention may be provided as labels on a liner sheet, wherein one or more labels are present on a single liner sheet.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A laminate comprising:
   a dye layer comprising an activatable coating, wherein the activatable coating comprises a sublimation-type dispersed dye and a binder,
   a face layer, and
   an adhesive layer for application to a substrate,
   wherein the face layer is disposed between the dye layer and the adhesive layer;
   wherein the activatable coating is activated by an acrylic-based adhesive external to the laminate; and
   wherein the sublimation type dispersed dye bleeds into the acrylic-based adhesives and changes shade or color when activated by interacting with the acrylic compounds in the acrylic-based adhesive.

2. The laminate of claim 1 wherein the laminate has a thickness of about 35 microns to about 210 microns.

3. The laminate of claim 1 wherein the dye layer has a thickness of about 0.2 microns to about 20 microns.

4. The laminate of claim 1 wherein the face layer has a thickness of about 20 microns to about 150 microns.

5. The laminate of claim 1 wherein the adhesive layer has a thickness of about 5 microns to about 40 microns.

6. The laminate of claim 1 further comprising a liner adjacent to the adhesive layer, wherein the liner is removable.

7. The laminate of claim 6 wherein the liner comprises a release coating on a face of the liner, and wherein said face of the liner is in contact with the adhesive layer.

8. The laminate of claim 6 wherein the release liner has a thickness of about 12 microns to about 100 microns.

9. The laminate of claim 8 wherein the laminate has a thickness of about 47 microns to about 310 microns.

10. The laminate of claim 6 wherein the release coating is a silicone coating.

11. The laminate of claim 1 wherein the adhesive layer comprises a pressure sensitive adhesive.

12. The laminate of claim 1 wherein the dye layer further comprises one or more dispersing agents, cross linkers, catalyst, and/or photo initiators.

13. The laminate of claim 1 wherein the sublimation-type dispersed dye is water insoluble.

14. The laminate of claim 1 wherein the sublimation-type dispersed dye is soluble in and compatible with acrylic polymers.

15. The laminate of claim 1 wherein the binder is a polyurethane-based binder.

16. The laminate of claim 1 wherein the binder is a polyethylenimine-based binder.

17. The laminate of claim 1 wherein the binder is a polyurethane-based binder, a polyethylenimine-based binder, or a combination thereof.

18. The laminate of claim 1 wherein the dye layer is evenly coated on the face layer.

19. The laminate of claim 1 wherein the dye layer is evenly coated on at least a portion of a surface of the face layer.

20. The laminate of claim 1 wherein the dye layer is evenly coated on at least 25% of a surface of the face layer.

21. The laminate of claim 1 wherein the dye layer is evenly coated on at least 50% of a surface of the face layer.

22. The laminate of claim 1 wherein the dye layer is evenly coated on an entire surface of the face layer.

23. The laminate of claim 1 wherein the activatable coating is present at a coat weight of about 0.2 gram per square meter to about 10 grams per square meter.

24. The laminate of claim 23 wherein the activatable coating is present at a coat weight of about of about 1 gram per square meter to about 5 grams per square meter.

25. The laminate of claim 1 wherein the dye is present in an amount from about 1% to about 50% of the binder amount by dry weight.

26. The laminate of claim 1 wherein the dye is present in an amount from about 5% to about 25% of the binder amount by dry weight.

27. A tamper indication system comprising the laminate of claim 1 wherein the substrate is a container and the adhesive layer is applied to the container.

28. The tamper indication system of claim 27 wherein the laminate changes color after activation by the adhesive external to the laminate.

29. The tamper indication system of claim 28 wherein the laminate changes color at least five minutes after activation by the adhesive external to the laminate.

30. The tamper indication system of claim 27 wherein the container is a package.

\* \* \* \* \*